US009634916B2

(12) United States Patent
Briscoe et al.

(10) Patent No.: US 9,634,916 B2
(45) Date of Patent: Apr. 25, 2017

(54) SIGNALLING CONGESTION

(71) Applicant: BRITISH TELECOMMUNICATIONS PUBLIC LIMITED COMPANY, London (GB)

(72) Inventors: Robert John Briscoe, London (GB); Carla Di Cairano-Gilfedder, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 398 days.

(21) Appl. No.: 14/384,097

(22) PCT Filed: Mar. 11, 2013

(86) PCT No.: PCT/GB2013/000105
§ 371 (c)(1),
(2) Date: Sep. 9, 2014

(87) PCT Pub. No.: WO2013/132213
PCT Pub. Date: Sep. 12, 2013

(65) Prior Publication Data
US 2015/0029887 A1    Jan. 29, 2015

(30) Foreign Application Priority Data

Mar. 9, 2012  (EP) ...................................... 12250053
Nov. 2, 2012  (GB) ...................................... 1219826.3

(51) Int. Cl.
*H04L 12/26* (2006.01)
*H04L 12/823* (2013.01)
(Continued)

(52) U.S. Cl.
CPC ........ *H04L 43/062* (2013.01); *H04L 43/0876* (2013.01); *H04L 47/12* (2013.01);
(Continued)

(58) Field of Classification Search
CPC ... H04L 43/062; H04L 43/0876; H04L 47/12; H04L 47/30; H04L 47/31; H04L 47/326
See application file for complete search history.

(56) References Cited

U.S. PATENT DOCUMENTS 7,139,281 B1    11/2006  Bodin
9,456,377 B2 *  9/2016   Han ................. H04W 28/0242
(Continued)

OTHER PUBLICATIONS

H. Ohsaki et al., "FI-RED: AQM Mechanism for Improving Fairness among TCP Connections in Tandem Networks", *Applications and the Internet Symposium 2006*, http://citeseerx.ist.psu.edu/viewdoc/summary?doi=10.1.1.76.7702, 2 pgs.
(Continued)

*Primary Examiner* — Melvin Marcelo
(74) *Attorney, Agent, or Firm* — Nixon & Vanderhye P.C.

(57) ABSTRACT

Methods and apparatus are disclosed for signalling congestion being caused by data items such as packets, received at a network element such as a router, in a communications network such as the Internet, or being caused by items otherwise requiring service or capacity from a shared resource. Preferred embodiments of the method involve identifying whether or not received data items received at a network element are capable of carrying congestion indications such as ECN marks, and for those that are capable, assigning congestion indications to the data items in dependence on a queue length characterization based on a substantially current, instantaneous measurement of the length of the queue, whereas for those that are not capable, a sanction such as dropping may be applied in dependence on a different queue length characterization based on a weighted moving average of current, recent, and less recent measurements of the length of the queue.

18 Claims, 8 Drawing Sheets

Flow diagram for AQM with smoothed loss signalling but instantaneous ECN signalling

(51) Int. Cl.
*H04L 12/801* (2013.01)
*H04L 12/835* (2013.01)
*H04L 12/833* (2013.01)

(52) U.S. Cl.
CPC .............. *H04L 47/30* (2013.01); *H04L 47/31* (2013.01); *H04L 47/326* (2013.01)

(56) References Cited

U.S. PATENT DOCUMENTS

| | | | |
|---|---|---|---|
| 2003/0088690 | A1 | 5/2003 | Zuckerman et al. |
| 2003/0112814 | A1 | 6/2003 | Modali et al. |
| 2004/0179479 | A1 | 9/2004 | Thibodeau et al. |
| 2006/0045011 | A1* | 3/2006 | Aghvami ............... H04L 47/10 370/230 |
| 2011/0211449 | A1 | 9/2011 | Attar et al. |
| 2011/0292801 | A1 | 12/2011 | Turnbull et al. |

OTHER PUBLICATIONS

M. Alizadeh et al., "DCTCP: Efficient Packet Transport for the Commoditized Data Center", *Proc. ACM SIGCOMM 2010*: http://research.microsoft.com/pubs/121386/dctcp-public.pdf, 15 pgs.

M. May et al., "Influence of Active Queue Management Parameters on Aggregate Traffic Performance", *INRIA Research Report 3995* Aug. 2000: http://hal.inria.fr/docs/00/07/26/50/PDF/RR-3995.pdf, 24 pgs.

K. Ramakrishnan et al., "The Addition of Explicit Congestion Notification (ECN) to IP", *IETF Request for comments 3168* (Sep. 2001),: http://www.rfc-editor.org/rfc/pdfrfc/rfc3168.txt.pdf, 63 pgs.

P. K. Chong et al., "A fair AQM scheme for aggregated ECN and non-ECN traffic", Computer Communications, vol. 27, No. 7, pp. 589-603, 2004, A fair AQM scheme for aggregated ECN and non-ECN traffic, 15 pgs.

Ramakrishnan et al., "A Binary Feedback Scheme for Congestion Avoidance in Computer Networks", *ACM Transactions on Computer Systems*, vol. 8, No. 2, May 1990, pp. 158-181:, http://ccrg.soe.ucsc.edu/CMPE252A/FALL2012/PAPERS/decbit.pdf.

ITU-T Rec. I.371, "Traffic Control and Congestion Control in B-ISDN," *ITU-T Recommendation 1.371* (Mar. 2004) (Mar. 2004): https://www.itu.int/rec/dologin_pub.asp?lang=e&id=T-REC-I.371-200403-I!!PDF-E&type=items, 134 pgs.

IEEE802.1Qau, "IEEE Standard for Local and Metropolitan Area Networks—Virtual Bridged Local Area Networks—Amendment: 10: Congestion Notification," IEEE Draft standard 802.1Qau Draft 2.4 (2006), Abstract http://www.ieee802.org/1/pages/802.1au.html, 13 pgs.

Floyd et al., "Random Early Detection gateways for Congestion Avoidance", IEEE/ACM Transactions on Networking, vol. 1-4 , pp. 397-413, Aug 1993., http://dl.acm.org/citation.cfm?id=169935.

Floyd, Recommendation on using the "gentle" variant of RED, (Mar. 2000)., http://www.icir.org/floyd/red/gentle.html , 1 pg.

Athuraliya et al., "REM: active queue management" *IEEE Network*, 15, 3, 2001, http://netlab.caltech.edu/publications/cbefREM2001.pdf , 12 pgs.

Feng et al., BLUE: a new class of active queue management algorithms. Technical report CSE-TR-387-99, *University of Michigan*, http://www.eecs.umich.edu/techreports/cse/99/CSE-TR-387-99.pdf, 27 pgs.

Hollot et al., "On Designing Improved Controllers for AQM Routers Supporting TCP Flows," In: *INFOCOM*, pp. 1726-1734 (2001), ftp://ftp.cs.umass.edu/pub/net/pub/MisraInfocom01-AQM-Controller.pdf.

Jacobson et al, "Red in a different light": https://www.cnaf.infn.it/~ferrari/papers/ispn/red_light_9_30.pdf, 38 pgs.

Nichols et al., "Controlling Queue Delay", ACM Queue vol. 10, No. 5 (May 2012), http://queue.acm.org/detail.cfm?id=2209336 , 10 pgs.

Gibbens et al., "Resource pricing and the evolution of congestion control", *Automatica*, 35, 1999, http://www.statslab.com.ac.uk/~frank/evol.pdf, 35 pgs.

Eardley, "Metering and Marking Behaviour of PCN-Nodes", *IETF RFC 5670* (Nov. 2009), http://tools.ietf.org/pdf/rfc5670.pdf, 20 pgs.

Wischik, "Large Deviations and Internet Congestion", PhD Dissertation, University of Cambridge (Sep. 1999), http://www.wischik.com/damon/Work/Research/phd.pdf, 89 pgs.

Briscoe et al., "An Open ECN Service in the IP layer", *IETF Internet Draft*, draft-draft-ietf-tsvwg-ecn-ip-00, http://tools.ietf.org/pdf/draft-ietf-tsvwg-ecn-ip-00.pdf, 24 pgs.

Prabhakar et al., "Buffers: The great boon and bane of packet switching", Plenary talk (2011), http://forum.stanford.edu/events/2011slides/plenary/2011plenaryPrabhakar.pdf, 48 pgs.

International Search Report for PCT/GB2013/000105, mailed Apr. 26, 2013.

Written Opinion of the International Searching Authority for PCT/GB2013/000105, mailed Apr. 26, 2013.

GB Search Report for GB Application No. 1219826.3, dated Mar. 2, 2013, 4 pages.

EP Search Report for EP Application No. 12250053.1, dated May 25, 2012, 9 pages.

Office Action dated Jan. 2, 2017 issued in corresponding European Application No. 13 709 493.4-1862 (12 pgs.).

* cited by examiner

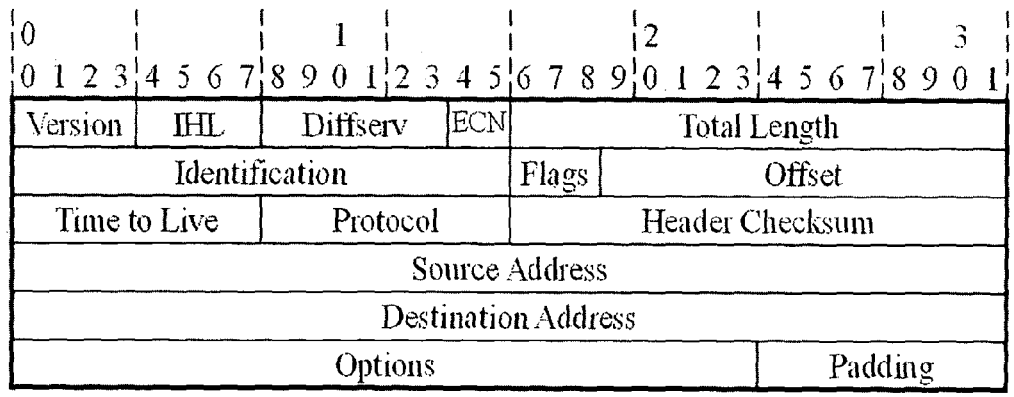
Figure 1 - IPv4 header
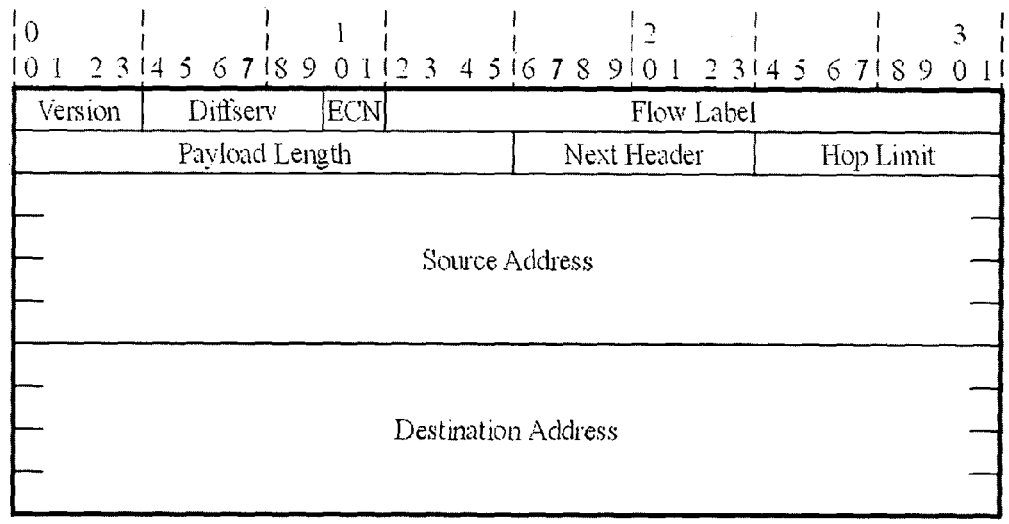
Figure 2 – IPv6 header
| Codepoint meaning | Codepoint name | ECN field |
|---|---|---|
| Not ECN-capable transport | Not-ECT | 0  0 |
| ECN-capable transport | ECT(1) | 0  1 |
| ECN-capable transport | ECT(0) | 1  0 |
| Congestion Experienced | CE | 1  1 |
Figure 3 – Definition of the Explicit Congestion Notification (ECN) field in either IPv4 or IPv6

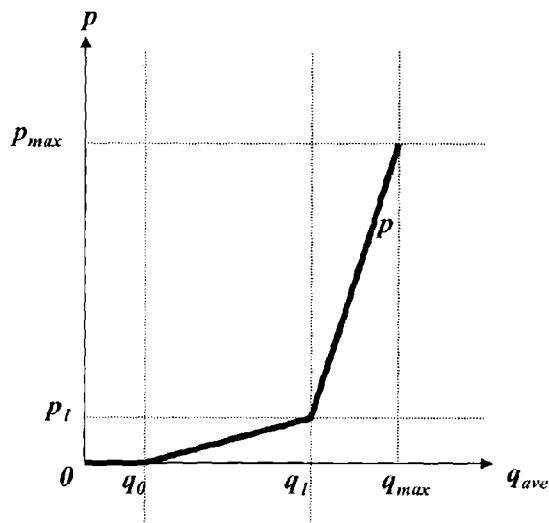
4b) Probability, $p$, of packet discard or marking as a function of smoothed queue, $q_{ave}$
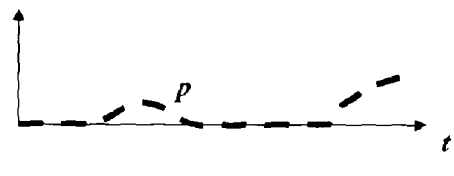
4c) Probability, $p$, of packet discard or marking over time for the example queuing process at 1a)
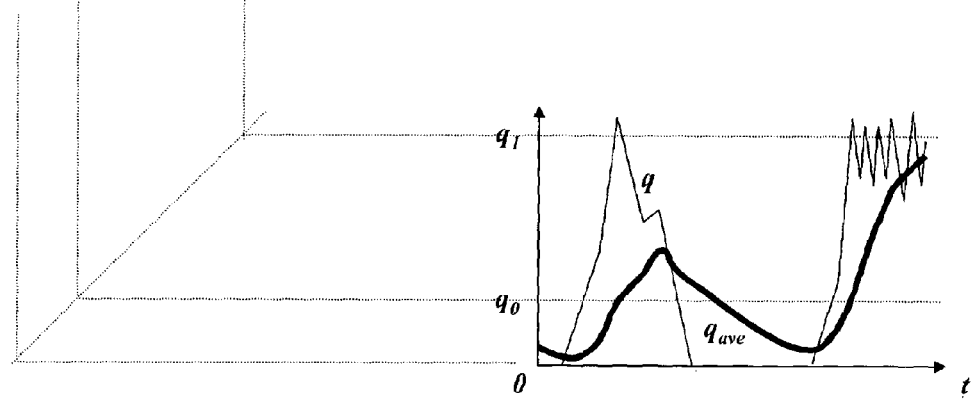
4a) Example queuing process, $q$ and smoothed queue $q_{ave}$ both against time, $t$
Figure 4: Current Random Early Detection (RED) Active Queue Management (AQM)

5b) Probability, $p_N$, of packet discard as a function of smoothed queue, $q_{ave}$ and probability, $p_E$, of packet marking as a function of instantaneous queue, $q$ 5c) Probability, $p_N$, of packet discard and probability, $p_E$, of packet marking, both over time for the example queuing process at 1a)

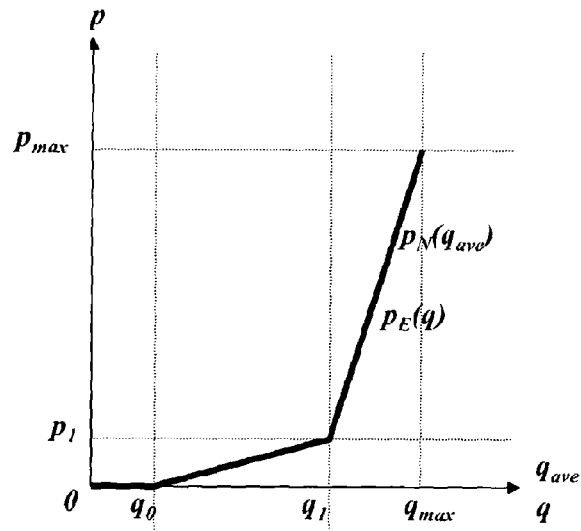

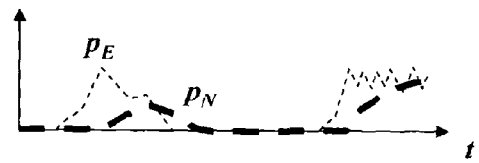

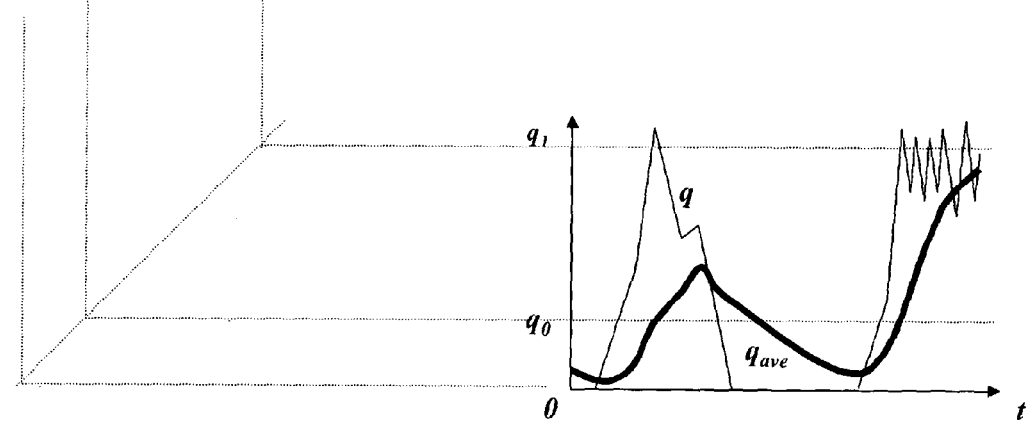

5a) Example queuing process, $q$ and smoothed queue $q_{ave}$ both against time, $t$ Figure 5: RED AQM modified with instantaneous ECN signalling 6b) Probability, $p_N$, of packet discard as a function of smoothed queue, $q_{ave}$ and probability, $p_E$, of packet marking as a function of instantaneous queue, $q$

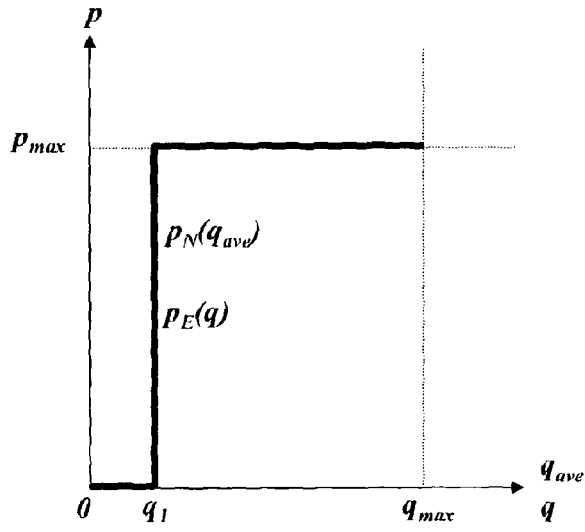

6c) Probability, $p_N$, of packet discard and probability, $p_E$, of packet marking, both over time for the example queuing process at 1a)

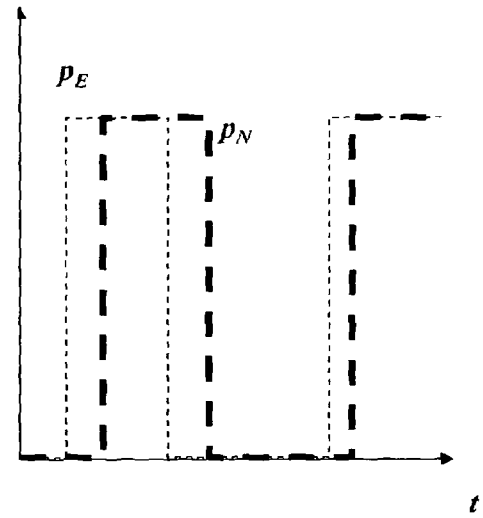

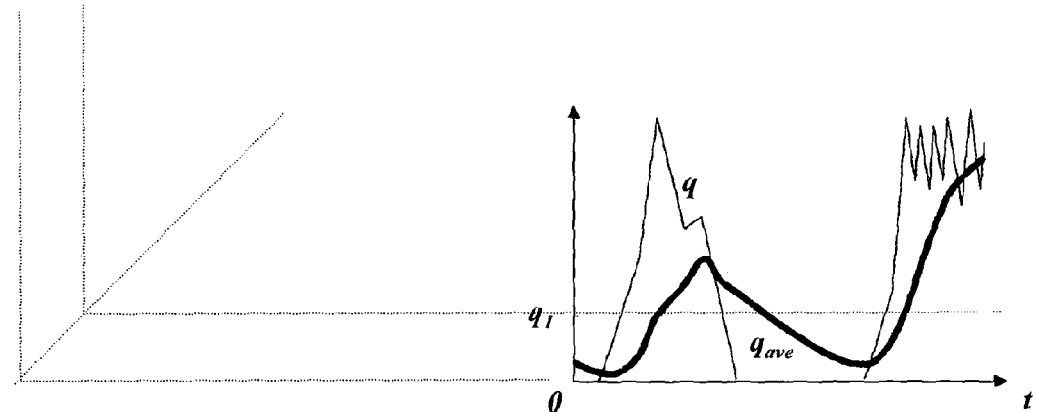

6a) Example queuing process, $q$ and smoothed queue $q_{ave}$ both against time, $t$ Figure 6 – Threshold AQM with smoothed loss signalling but instantaneous ECN signalling

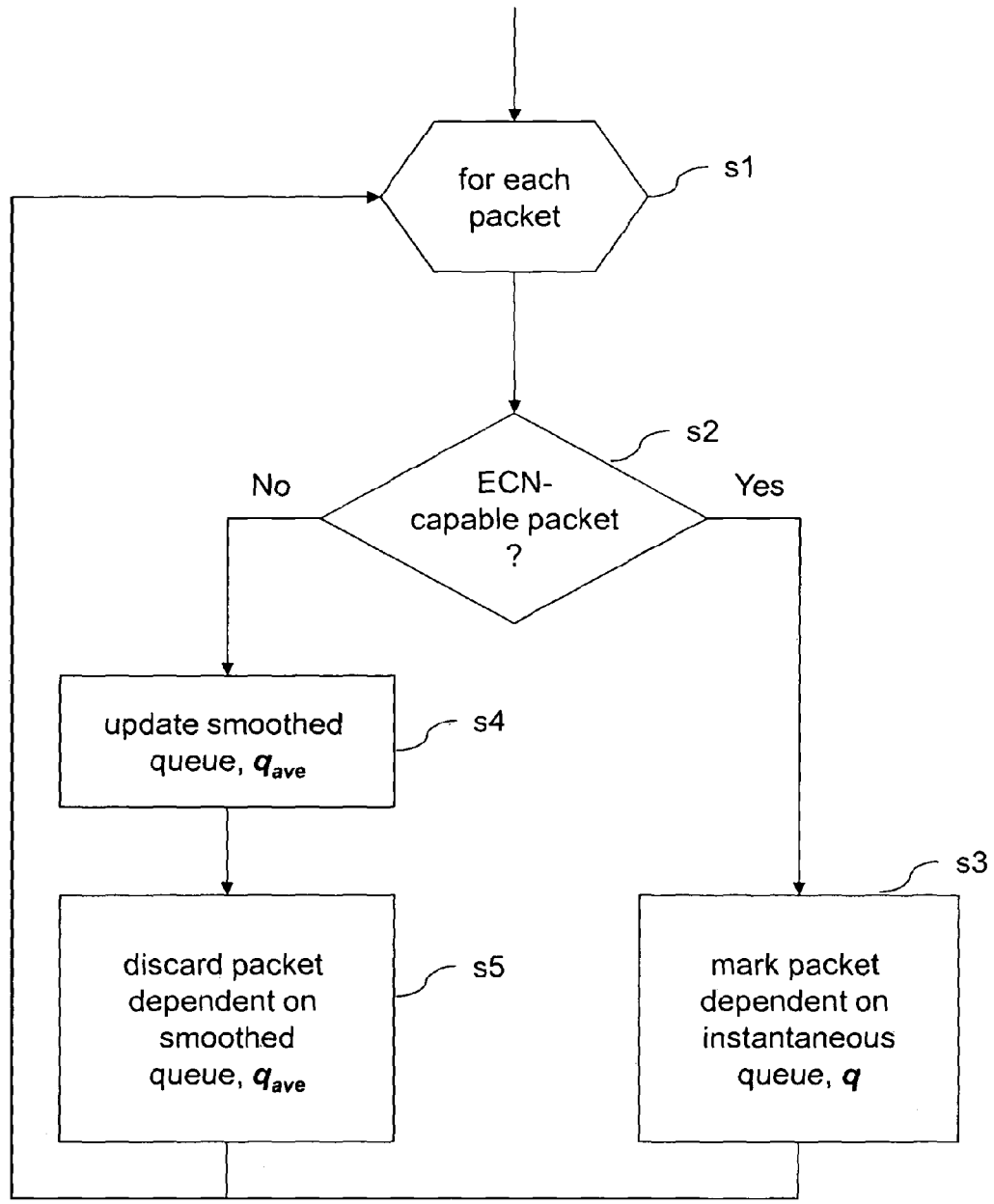
Figure 7 – Flow diagram for AQM with smoothed loss signalling but instantaneous ECN signalling

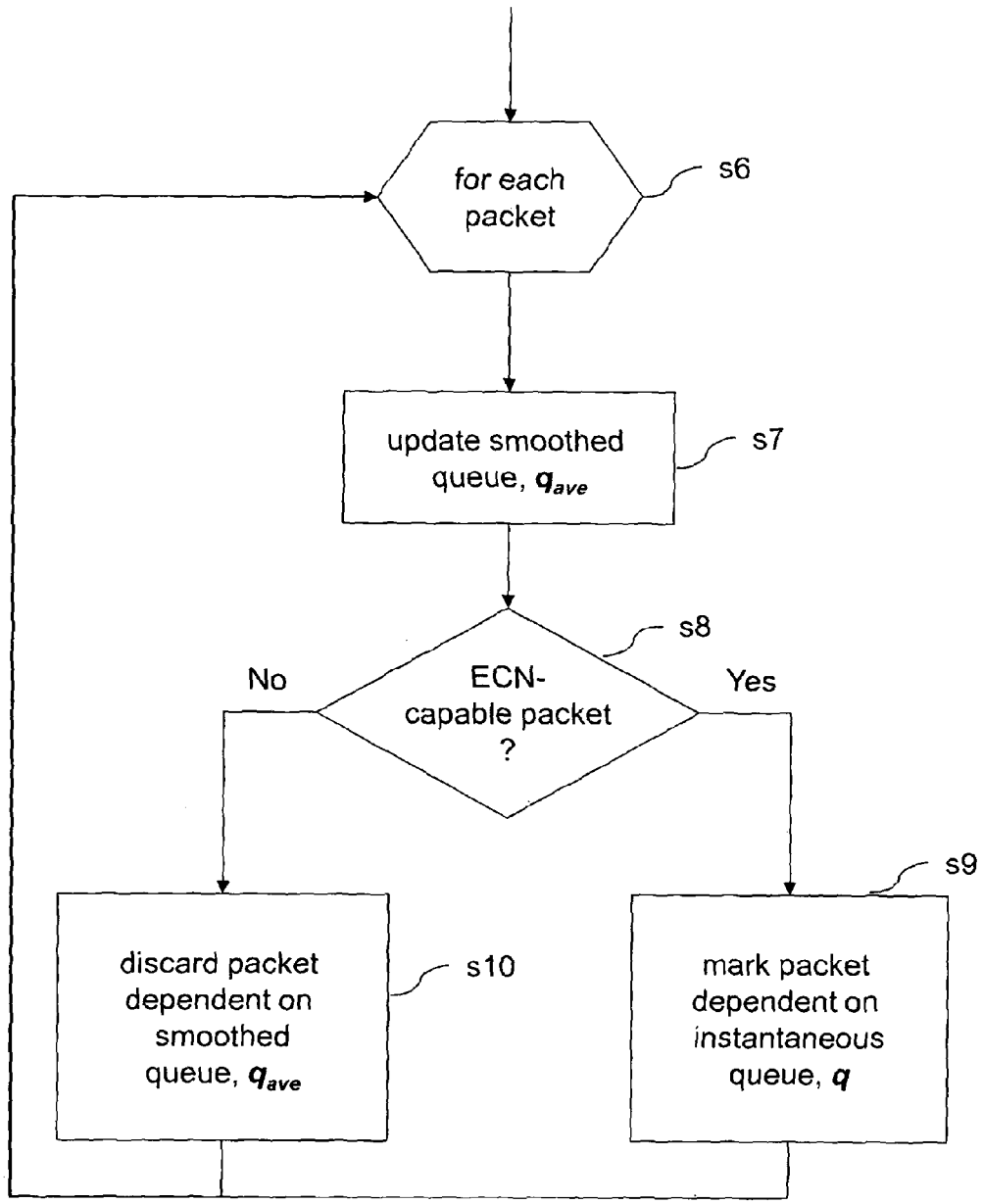
Figure 8 – Alternative flow diagram for AQM with smoothed loss signalling but instantaneous ECN signalling

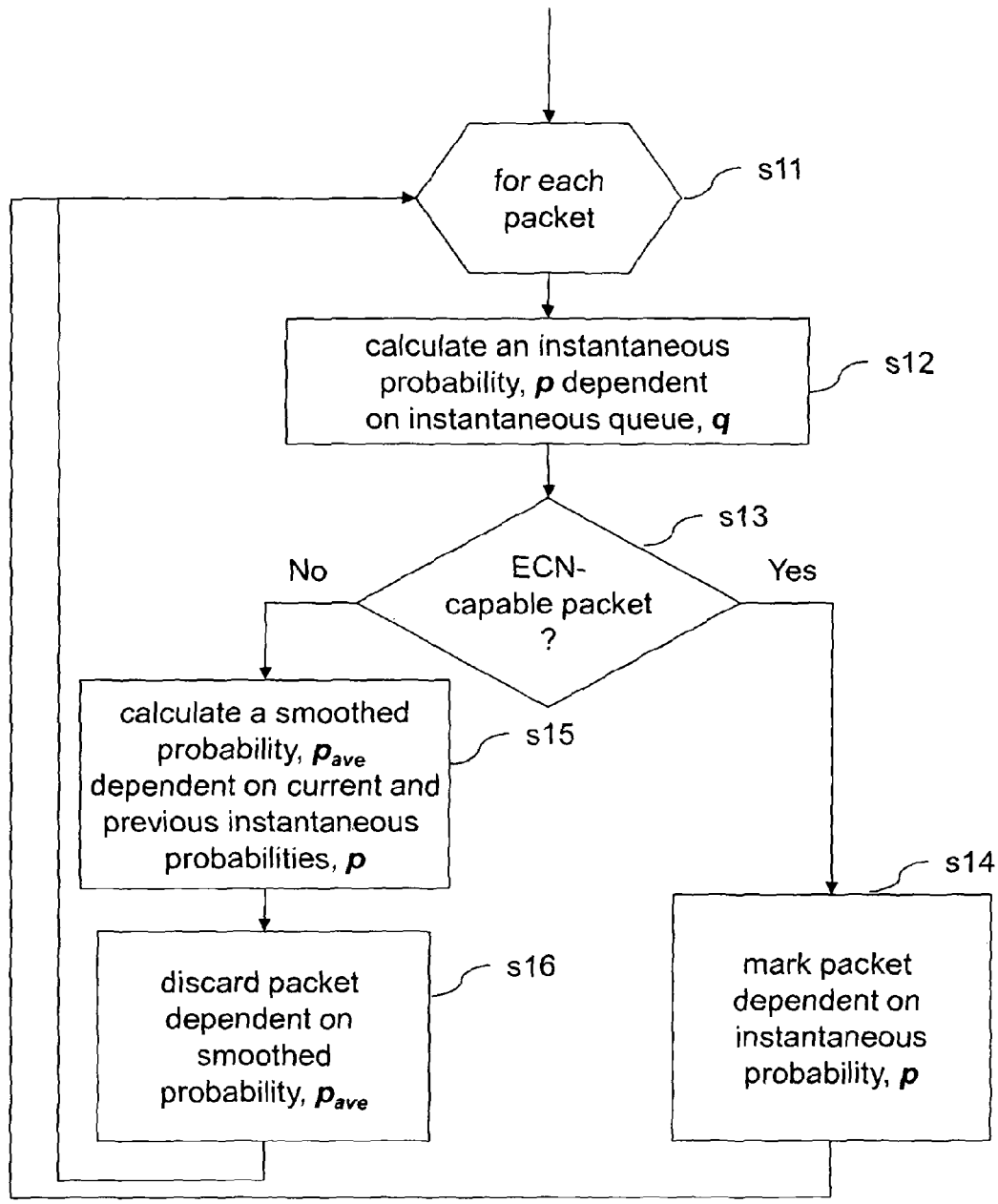
Figure 9 – Alternative flow diagram for AQM with smoothed probability rather than smoothed queue length

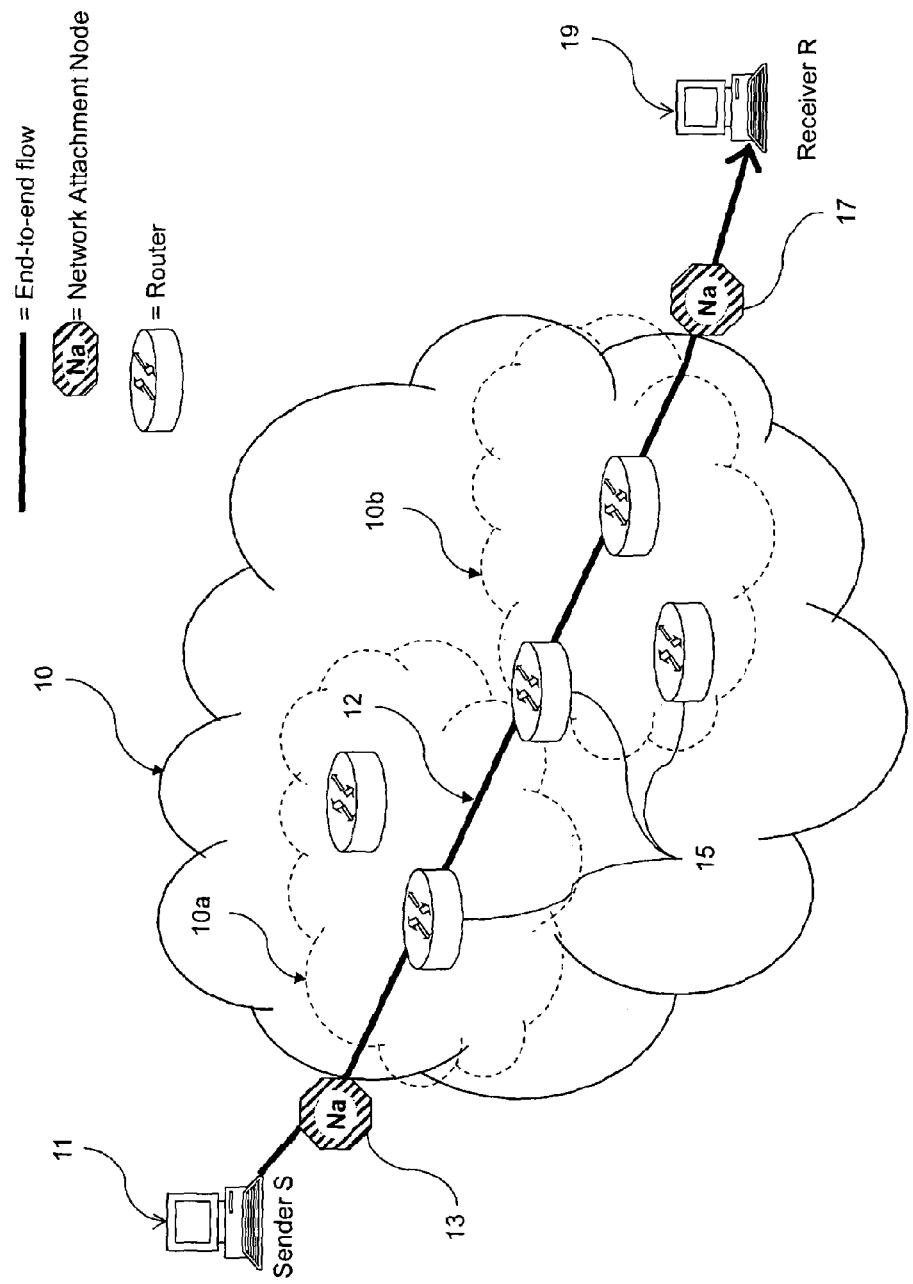
Figure 10 - Schematic of typical network

SIGNALLING CONGESTION

This application is the U.S. national phase of International Application No. PCT/GB2013/000105, filed 11 Mar. 2013, which designated the U.S. and claims priority to EP Application No. 12250053.1, filed 9 Mar. 2012; and GB Application No. 1219826.3, filed 2 Nov. 2012, the entire contents of each of which are hereby incorporated by reference.

TECHNICAL FIELD

The present invention relates to methods and apparatus for signalling congestion being caused by data items such as packets received at a network element such as a router in a communications network such as the Internet, or being caused by items otherwise requiring service or capacity from a shared resource.

BACKGROUND TO THE INVENTION AND PRIOR ART

We start by presenting some basic concepts to facilitate the understanding of the numerous policing techniques that are presented afterwards.

Packets

A data sender usually splits data to be sent into small units known as packets. Each packet consists of a header and a payload carrying the data to be delivered. The header contains fields defined by the relevant communication protocol. The great majority of packets carried by commercial networks nowadays are so-called IP packets. IP is the Internet Protocol. This ensures that a network of routers can forward any packet from the source to its destination. IP is a connectionless protocol—that means that the header information in each data packet is sufficiently self-contained for routers to deliver it independently of other packets; each packet could even take a different route to reach the destination.

Distributed Bandwidth Sharing and Congestion

Data traversing the Internet follows a path between a series of routers, controlled by various routing protocols. Each router seeks to move the packet closer to its final destination. If too much traffic traverses the same router in the network, the router can become congested and packets start to experience excessive delays whilst using that network path. If sources persist in sending traffic through that router it could become seriously overloaded (congested) and even drop traffic (when its buffers overflow). If sources still persist in sending traffic through this bottleneck it could force more routers to become congested, and if the phenomenon keeps spreading, that can lead to a congestion collapse for the whole Internet—which occurred regularly in the mid-1980s.

The solution to that problem has been to ensure that sources take responsibility for the rate at which they send data over the Internet by implementing congestion control mechanisms. Sources monitor feedback from the receiver of the metric that characterises path congestion in order to detect when the path their data is following is getting congested, in which case they react by reducing their throughput—while they may slowly increase their rate when there is no sign of the path becoming congested.

Typical path characterisation metrics that sources monitor are average roundtrip time (RTT) for the data path, variance of the roundtrip time (jitter) and level of congestion on the path.

The congestion level can be signalled either implicitly (through congested routers dropping packets when their buffers overflow or to protect themselves) or explicitly (through mechanisms such as explicit congestion notification—see next subsection). Currently the most common option is implicit signalling.

Sources using TCP are able to detect losses, because a packet loss causes a gap in the sequence; whenever a TCP source detects a loss, it is meant to halve its data transmission rate, but no more than once per round trip time, which alleviates the congestion on the router at the bottleneck.

DEC-Bit Scheme

The DEC-bit scheme was the ancestor of modern mechanisms to convey congestion notification in packet networks by providing explicit congestion notification to the sources. This is discussed in a paper entitled "A Binary Feedback Scheme for Congestion Avoidance in Computer Networks" by Ramakrishnan and Jain, which will be referred to for convenience as [RAN90a]. Bibliographic details of this and other prior art documents are provided in the "References" section below. With this scheme when a router detects congestion it sets a bit (CI) in each packet, the receiver then relays this information back to the sender in its acknowledgments, and the sender in turn adjusts its transmission rate. In the router the congestion detection algorithm is based on average queue length. The source reaction to DEC-bit in acknowledgments is an Additive Increase Multiplicative Decrease (AIMD) response which means that congestion window grows at linear rate in the absence of congestion feedback and it declines multiplicatively (i.e. exponentially) for every congestion feedback event.

Explicit Congestion Notification

Explicit Congestion Notification (ECN) [RFC3168] conveys congestion in TCP/IP networks by means of two-bit ECN field in the IP header, whether in IPv4 (see FIG. 1) and IPv6 (see FIG. 2). Prior to the introduction of ECN, these two bits were present in both types of IP header, but always set to zero. Therefore, if these bits are both zero, a queue management process assumes that the packet comes from a transport protocol on the end-systems that will not understand the ECN protocol so it only uses drop, not ECN, to signal congestion.

The meaning of all four combinations of the two ECN bits is shown in FIG. 3. If either bit is one, it tells a queue management process that the packet has come from an ECN-capable transport (ECT) that will understand ECN marking, as well as drop, as a signal of congestion. When a queue management process detects congestion, for packets with a non-zero ECN field, it sets the ECN field to the Congestion Experienced (CE) codepoint. On receipt of such a marked packet, a TCP receiver sets the Echo Congestion Experienced (ECE) flag in the TCP header, which the TCP source interprets as if the packet has been dropped for the purpose of its rate control.

Drop and congestion signals are not mutually exclusive signals, and flows that enable ECN have the potential to detect and respond to both signals.

As well as the idea of ECN being adopted in IP, it was previously adopted in Frame Relay and ATM, but in these latter two protocols the network arranges feedback of the congestion signals internally, and the network enforces traffic limits to prevent congestion build-up [ITU-T Rec.I.371]. When a cell arriving at a switch causes a congestion threshold to be exceeded, then its EFCI bit is set.

The IEEE has standardised an explicit congestion approach where Ethernet switches not the end systems arrange to feedback the congestion signals, although the Ethernet device on the sending system is expected to cooperate by reducing its rate in response to the signals. The approach is tailored exclusively for homogeneous data centre environments.

In previous approaches, each frame (or packet) carried just a binary flag and the strength of the congestion signal depended on the proportion of marked frames—effectively a unary encoding of the congestion signal in a stream of zeroes and ones. However, the IEEE scheme signals a multi-bit level of congestion in each feedback frame, hence its name: Quantised Congestion Notification or QCN [IEEE802.1Qau].

Random Early Detection (RED)

Historically, routers would drop packets when they got completely saturated (i.e. when a traffic burst cannot be accommodated in the buffer of the router)—this policy is called drop-tail. Random early detection (RED) [RED] is an improvement intended to desynchronise TCP flows (synchronisation occurs when multiple TCP flows increase and decrease their transmission window at the same time). RED is an active queue management (AQM) process that monitors the average queue length in a buffer and when this is higher than a given threshold, the router starts to drop/mark packets with a probability which increases with the excess length of the averaged queue over the threshold. RED is widely used in today's Internet because it allows sources to react more promptly to incipient congestion and it keeps queues from growing unnecessarily long. Equipment vendors have implemented variants of RED, e.g. Cisco' proprietary implementation is Weighted Random Early Detection (WRED). However, it is well known that RED is very sensitive to parameter setting.

In the course of experimental work to investigate the sensitivity of RED to its parameter settings, the timescale over which RED averaged the queue was investigated, and in one case at least averaging was turned off completely, instead using the instantaneous queue [RED-params].

The use of an Active Queue Management (AQM) technique using Random Early Detection (RED) will be described with reference to FIG. 4.

RED randomly drops/marks packets with a probability p that depends upon the smoothed queue $q_{ave}$. In a RED-based AQM, a smoothed queue $q_{ave}$ is continuously estimated by means of an exponential weighted moving average (EWMA) of the real queue q:

$$q_{ave} \leftarrow (1-w_q)q_{ave} + w_q q$$

where $w_q$ is the weight given to the real queue's length; see FIG. 4a) for an example of real queue versus smoothed queue evolution over time.

When the smoothed queue size $q_{ave}$ is below a minimum threshold $q_0$ then no packets are dropped/marked. When $q_{ave}$ is between $q_0$ and $q_1$ then packets are discarded with a probability p, between 0 and $p_1$, that is linearly proportional to $q_{ave}$. When $q_{ave}$ is greater than threshold $q_1$ then probabilistic drop/mark continues with an increased probability ranging between $p_1$ and $p_{max}$, which still depends linearly on $q_{ave}$. This is also known as the Gentle variant of RED algorithm [GRED] (see FIG. 4b)). Its behaviour differs from the original RED between $q_1$ and $q_{max}$: while GRED drops/marks packets with a probability which depends linearly upon smoothed queue length with a maximum probability $p_{max}$, in such interval RED marks with a maximum probability $p_{max}$. See FIG. 4c) for an example of time evolution of packet drop/mark probability. Assuming the Sources of packet load are responsive to congestion, it can be seen that a period of drops/marks p>0 results in senders slowing down, which results in reduced queue length and hence no drop/mark p=0; subsequently senders increase their transmission rate which results in an increased queue length, note that it takes some time before p>0 again because of the queue length smoothing.

Fairness Improvement for RED (FI-RED)

A paper entitled "FI-RED: AQM Mechanism for Improving Fairness among TCP Connections in Tandem Networks" by H. Ohsaki et al [FI-RED] discusses an active queue management mechanism for improving fairness among heterogeneous TCP connections. In FI-RED, an ECN-based technique is used for differentiating the packet marking probability of RED in dependence on whether the CE (Congestion Experienced) bit is set in arriving packets. With FI-RED, congestion indications to TCP connections with a large number of hops (i.e. those connections with a high probability that the CE bit is set) are suppressed. By virtue of such a modification to RED, a TCP connection with a large number of hops will suffer almost the same packet marking probability as one with a small number of hops. This is intended to improve fairness among TCP connections with different numbers of hops. It will be noted that with FI-RED, ECN marks are assigned to packets with a marking probability based on pre-existing congestion markings on the arriving packets (not the ECN-capability itself), which is then compared with the marking probability determined from the local queue length by the traditional RED algorithm.

Random Exponential Marking (REM) [REM]

Whereas with RED, congestion notification depends upon the average queue length, with the REM AQM, congestion signals depend on rate deviation (i.e. queue growth over a period) and queue deviation (i.e. difference between queue length and a target queue length). The queue is sampled periodically. Between samples, the congestion signal thus depends on a delayed rather than an instantaneous measure of the queue. The probability of marking or dropping in the REM AQM is characterised by an exponential as opposed to a piece-wise linear function used by RED, and similarly to RED congestion feedback can be by dropping or by ECN marking. The exponential function in REM ensures that signals accumulated along a path are precisely summed to signal end-to-end congestion to the source.

BLUE

BLUE [BLUE] is an AQM designed to overcome the inefficiencies that arise in the presence of bursty traffic and AQMs based on a smoothed queue such as RED. With bursty traffic, queue length often oscillates wildly and RED-like AQMs that drop based on smoothed queue length are unable to react sufficiently quickly. BLUE maintains a probability of packet marking or dropping which is based on actual queue occupancy hence, congestion notification (drop or ECN-mark) depends upon actual queue length and not smoothed queue length. This marking probability is increased when packets are being dropped and is decreased when there is less congestion.

Proportional-Integral (PI)

Proportional-integral [PI] controllers are controllers based on feedback control theory which perform AQM functions. Like BLUE, a key feature of the PI controller is to use the instantaneous queue size not an averaged queue length to determine marking and/or loss probability, in order to minimise delay of the feedback signal.

RED in a Different Light (nRED)

nRED is a self-configuring variant of RED which is available online [nRED] but has not been published in peer reviewed journals or conferences. This AQM estimates the persistent queue, which differs from the smoothed-RED queue as it only seeks to track persistent buffer occupancy that has not cleared within a given time interval. This is achieved by means of a filtered function of the instantaneous queue length. It compares the instantaneous queue to the filtered value and, if it is greater, the filtered function rises using the same exponentially weighted moving average as RED, but if it is less, the filtered value tracks the instantaneous queue downwards.

Controlled Delay (CoDel)

CoDel [CoDel] superseded nRED. It uses the service time (or sojourn time) that a packet spends in a queue as the characterisation of queue length and produces a smoothed value of recent sojourn times by taking the minimum sojourn time seen over a recent time interval.

Sample Path Shadow Pricing (SPSP)

Sample Path Shadow Pricing (SPSP) [GI99] is a scheme which prescribes to mark packets that cause the unsmoothed queue to exceed a threshold and then lead to buffer overflow. This is unattainable in practice, as a packet may have left the queue by the time a decision is made that it should have been marked. However, it is used as a theoretical ideal e.g. to define the SPSP marking fairness principle, that is, a marking algorithm satisfies SPSP fairness if it marks the same number of packets that SPSP would have marked. SPSP purely concerns ECN marking and does not consider loss.

Pre-Congestion Notification (PCN)

The IETF pre-congestion notification (PCN) architecture is a framework that supports Quality of Service (QoS) of inelastic traffic within a DiffServ domain. Admission control (or flow termination) of inelastic traffic in a PCN-domain depends upon the marked PCN-traffic observed within the priority class reserved for PCN-traffic. PCN traffic can coexist with other traffic and receive different treatment within the queue. Two PCN marking algorithms have been standardised[PCN] based on the idea of virtual queue [GI99] which is a fictitious queue that emulates the behaviour of a real queue if it were draining at a slower rate that the actual link capacity.

The standardised PCN marking algorithms both use the instantaneous length of the virtual queue, not a smoothed queue length as with DEC-bit or RED. PCN uses the Not-ECT codepoint in the ECN field (FIG. 3) in a similar way to ECN, in order to support a mixture of traffic sharing the same queue, some of which is capable of being PCN-marked and some hot. Non-PCN traffic sharing a priority queue would be dropped rather than marked if it exceeded the policed rate of the priority queue.

Congestion Control for High Bandwidth-Delay-Product (BDP) Networks

Traditional TCP/IP congestion control and recovery mechanics can be detrimental to the performance of delay sensitive applications. This is particularly problematic for high Bandwidth-Delay-Product (BDP) networks (also known as Long Fat Networks (LFN)). The literature on congestion control improvements for LFN is vast. It will not be covered further here, given the focus on AQM mechanisms in queues rather than congestion control algorithms in end-systems.

Reach Overload, Send ECN (ROSE)

The ROSE algorithm [WI99] is a queue marking variant of RED [RED] designed to improve its fairness while scaling to large networks. This is achieved by marking all packets whenever the queue size exceeds a threshold b and dynamically adapting b as follows:

if a packet would have been marked by SPSP, then decrease b, i.e. such that $b \leftarrow b - \kappa \epsilon$;

when a packet is marked then increase b, i.e. such that $b \leftarrow b + \epsilon$;

where $\kappa$ is a variable indicating how many marks are equivalent to a drop (1 or more) and $\epsilon$ is an infinitesimally small variable. This algorithm, which is based on actual queue length, can be shown to be fair to flows as it marks packets proportionally to the congestion they cause.

ROSE is particularly relevant because it starts from the premise that an ECN mark need not be equivalent to a drop, instead the two being linearly related through the parameter $\kappa$. However, ROSE is a theoretical demonstration of a point, rather than a concrete algorithm proposal, so it does not actually specify the algorithm that should be used to drop packets rather than mark them, although perhaps it is implied that ROSE would be used with $\kappa=1$.

Mark and Drop Signals

As discussed in [open-ECN], the ECN specification for TCP/IP [RFC3168] stipulates that a packet should only be congestion marked if it would have been dropped, were it unmarkable. It is even stipulated that this assumption should be embedded in implementations, by stating that the ECT flag should only be checked after the decision has been made to drop a packet. Exactly mimicking drop behaviour is motivated by the need to provide incentives for hosts to switch to ECN capability when competing with unmarkable flows.

The [open-ECN] report was an openly published review of the ECN specification during its progress along the IETF's standards track. It agrees with the ECN specification that one ECN mark needs to be equivalent to one drop, but only within the best efforts service, for incremental deployment reasons. For other service disciplines than best efforts, it takes the position of Wischik [WI99] that one ECN mark need not be equivalent to one drop.

Data Centre TCP

Data-centre TCP (DCTCP), proposed by Alizadeh Attar et al. [ALI10] and also discussed in US patent application US2011/0211449 (Attar et al) has shown the considerable benefit of signalling congestion based on the instantaneous length of the queue rather than signalling congestion dependent on a moving average of the queue length. As a result, DCTCP keeps buffers nearly empty nearly all the time, resulting in very low and very predictable delay and extremely low loss-rates, both of which lead to significantly superior performance.

DCTCP is an enhancement of TCP aimed at meeting the requirements of the applications running in data centres, so as to simultaneously achieve high throughput and burst tolerance as well as low latency. It relies on the usage of Explicit Congestion Notification [RFC3168]. The analysis of traffic patterns within Microsoft data centres have shown that even in the absence of the smoothing effects arising from multiplexing, DCTCP can achieve low queuing delay with low variance. DCTCP departs from earlier proposals by prescribing changes both at the senders and within network switches, which can be arranged to be deployed within a data centre where a single entity administers both:

Switch-side: the AQM in switches signals congestion by ECN marking packets based on instantaneous buffer length (i.e. no queue smoothing is carried out in switches as for example in RED). If the queue is greater than a threshold then it marks packets, otherwise it doesn't mark. This can be implemented with a RED AQM in commodity switches with a suitable choice of threshold parameters and the queue averaging parameter set to 1, which effectively turns off averaging.

Sender-side: it reacts to every congestion indication in proportion to congestion levels, i.e. the greater the number of ECN marks observed the greater the reduction in congestion window, Cwnd. The algorithm maintains average α of fraction F of packets marked in each RTT as follows:

F=(Number of marked ACKs)/(Total ACKs)

α←(1−g)α+g F (where 0<g<1 weight given to new samples)

Cwnd←(1−α/2)Cwnd

DCTCP does not specify what the AQM should do for packets that do not support ECN, because ECN support is enabled by construction of the scheme throughout the data centre.

Phantom Queue

The phantom queue [PR11] is aimed at achieving ultra-low latency solutions, particularly in data centres. The aim is to remove buffering delay from the data centre forwarding fabric by using a virtual queue on the switch (similar to PCN [PCN]) in combination with DCTCP [ALI10] on the end-systems.

Other Techniques

US patent application US2003/0088690 (Zuckerman et al) relates to an AQM process which splits ECN and non-ECN packets into separate queues, then treats them differently. When congestion rises, the rate of ECN-marking on ECN-capable packets is increased. For non-ECN-capable packets, delay is introduced as an alternative to increasing loss.

A paper entitled "A fair AQM scheme for aggregated ECN and non-ECN traffic" by Chong at al [ARQUA] describes a technique called ARQUA-DAB, which applies separate AQM algorithms to ECN and non-ECN traffic. ARQUA-DAB divides the capacity of the real link over two virtual buffers, each with service rates proportional to the number of ECN and non-ECN flows. It runs a substantially similar AQM algorithm in each virtual buffer, the only difference being the rates at which it drains the buffers.

U.S. Pat. No. 7,139,281 relates to a method of active queue management for handling prioritised traffic in a packet transmission system.

US2011292801 relates to a proposed modification to the ECN protocol to allow a receiver terminal to exhibit some control of bandwidth share relative to other receiver terminals.

US2003112814 relates to a system and method for traffic management and regulation in a packet-based communication network which aims to facilitate proactive, discriminating congestion control on a per flow basis of packets traversing the Internet via use of a WRED algorithm that monitors the incoming packet queue and optimises enqueuing or discard of incoming packets to stabilise queue length and promote efficient packet processing.

US2004179479 relates to methods for alleviating traffic congestion by selectively discarding packets in a switch or router. In particular, it is directed to the problem of calculating average queue depth for RED in a manner that responds to rapid increases and decreases in the instantaneous queue depth.

REFERENCES

[ALI10]: M. Alizadeh et al: "DCTCP: "Efficient Packet Transport for the Commoditized Data Center", Microsoft Technical Report (January 2010).

[ARQUA]: P. K. Chong et al: "A fair AQM scheme for aggregated ECN and non-ECN traffic", Computer Communications, Vol. 27, No. 7, pages 589-603, May 2004.

[BLUE]: W. Feng, D. Kandlur, D. Saha and K. Shin: "BLUE: a new class of active queue management algorithms", Technical report CSE-TR-387-99, University of Michigan.

[CoDel] Kathleen Nichols and Van Jacobson, "Controlling Queue Delay" ACM Queue Vol. 10 No. 5 (May 2012)

[FI-RED]: H. Ohsaki et al: "FI-RED: AQM Mechanism for Improving Fairness among TCP Connections in Tandem Networks", Proceedings of the 2006 International Symposium on Applications and the Internet (SAINT '06), pages 63-70, January 2006.

[GI99]: R. Gibbens and F. Kelly: "Resource pricing and the evolution of congestion control", Automatica, 35, 1999.

[GRED]: S, Floyd: "Recommendation on using the "gentle" variant of RED", March 2000. Available online: http://www.icir.org/floyd/red/gentle.html.

[IEEE802.1Qau]: "IEEE Standard for Local and Metropolitan Area Networks—Virtual Bridged Local Area Networks—Amendment: 10: Congestion Notification", IEEE Draft standard 802.1Qau Draft 2.4 (2006). Abstract URL: http://www.ieee802.org/1/pages/802.1au.html

[ITU-T Rec. I.371]: "Traffic Control and Congestion Control in B-ISDN", ITU-T Recommendation I.371 (03/04), March 2004. Available-online: http://www.itu.int/rec/recommendation.asp?type=folders(=e&parent=T-REC-I.371

[nRED]: V. Jacobson et al. "RED in a different light", September 1999. Available online: http://www.cnaf.inf-n.it/-ferrari/papersispn/red_light_9_30.pdf

[PCN]: P. Eardley: "Metering and Marking Behaviour of PCN-Nodes", IETF RFC 5670 (November 2009)

[PI]: Hollot, C. V., Misra, V., Towsley, D. F. & Gong, W.: "On Designing Improved Controllers for AQM Routers Supporting TCP Flows", In: INFOCOM pp. 1726-1734 (2001)

[RED-params]: M May et al: "Influence of Active Queue Management Parameters on Aggregate Traffic Performance", INRIA Research Report 3995, Sophia Antipolis, France, August 2000.

[RAN90a]: K. K. Ramakrishnan and R. Jain: "A Binary Feedback Scheme for Congestion Avoidance in Computer Networks", ACM Transactions on Computer Systems, February 1990.

[RED]: S. Floyd, and V. Jacobson: "Random Early Detection gateways for Congestion Avoidance", IEEE/ACM Transactions on Networking, Vol. 1-4 (pp. 397-413), August 1993.

[REM]: S. Athuraliya et al: "REM: active queue management", IEEE Network, 15, 3, 2001.

[RFC3168]: Ramakrishnan, K. K., Floyd, S. & Black, D.: "The Addition of Explicit Congestion Notification (ECN) to IP", IETF Request for comments 3168 (September 2001).

[WI99]: D. Wischik: "Large Deviations and Internet Congestion", PhD Dissertation, University of Cambridge (September 1999).

[open-ECN]: B. Briscoe, J. Crowcroft: "An Open ECN Service in the IP layer", IETF Internet Draft: draft-ietf-tsvwg-ecn-ip-00.

[PR11]: B. Prabhakar et al: "Buffers: The great boon and bane of packet switching", Plenary talk (2011). Available online: http://forum.stanford.edu/events/2011slides/plenary/2011plenaryPrabhakar.pdf

SUMMARY OF THE INVENTION

DCTCP was so-called because the only place where it seemed safe to deploy it was in the confines of a data centre. DCTCP uses radically different algorithms to those used currently on the Internet, both different at the sender and different in network buffers. However, unless all the algorithms at every host and every network node are changed at the same time, DCTCP interacts badly with the algorithms used on the existing Internet. Nonetheless, it is feasible for all the algorithms in a data centre to be changed simultaneously because they are under the control of one operator, which is how DCTCP has been deployed so far.

The present inventors have identified a change in the manner in which congestion is signalled which may be used to enable the superior performance of DCTCP (or a similar radically improved set of algorithms) to be deployed incrementally in pre-existing TCP/IP networks.

As will be explained in more detail below, preferred embodiments of the invention may be applied in relation to a queuing process on a network node to signal congestion such that, when signalling congestion in packets that are capable of explicit congestion notification, ECN signals are based on the instantaneous length of its queue, while for those packets that are not ECN-capable, loss signals are based on a smoothed average of its queue length.

Until now, nearly all queue management algorithms, whether proposed or in production, have used a smoothed average of the queue length. Only a few (including DCTCP) use the instantaneous queue length. But whichever choice they make, they always make the same choice for both ECN-capable and non-ECN-capable packets. According to preferred embodiments of the invention, the use of instantaneous queue length may be associated with the introduction of ECN on network nodes.

Brief Explanation

A pre-requisite for DCTCP is universal deployment of explicit congestion notification (ECN). However much of the Internet does not yet support ECN, evidenced by the large majority of packets indicating that they are not ECN-capable.

Traditionally, the process that manages a queue on an IP forwarding node is meant to signal congestion equivalently, whether or not a particular packet is capable of carrying an explicit congestion notification (ECN). For instance, if the queuing process starts probabilistically indicating congestion when the queue length exceeds a certain threshold, the threshold for marking ECN-capable packets has been the same as the threshold for discarding non-ECN-capable packets.

This equivalence is mandated in the ECN standard [RFC3168] because if it were otherwise it has always been thought that non-ECN packets would starve ECN packets. For instance, consider what would happen if the threshold for ECN marking were shallower than the threshold for packet loss. If the queue length reaches the drop threshold it will already have exceeded the ECN threshold. Therefore any ECN-capable packets will be marked with high probability, while non-ECN-capable packets will only just start being dropped.

Non-ECN flows will drive up the queue until it gives drop signals, which make them back off then increase again, so that on average they will hover around the drop threshold. Any ECN-capable flows sharing the same queue will then see nearly 100% ECN marking, so they will back off. But the ECN marking will not go away because the non-ECN flows will simply fill the queue in their place, trying to push the queue to the deeper drop threshold. Therefore the ECN flows will ratchet down and the non-ECN flows will ratchet up, quickly starving the ECN-flows out of the system.

With preferred versions of the proposed method, the thresholds for ECN and non-ECN packets may be the same, so one cannot starve the other. The difference is in the characterisation of the queue length that is compared against a given threshold:

For non-ECN packets a smoothed queue length is compared. Then the buffer can absorb a burst and, if the moving average hasn't reached a given threshold $T_1$ before the burst is over, no packets will be dropped.

For ECN packets, the instantaneous queue length is compared against a threshold $T_2$, (with $T_2$ probably=$T_1$) and since ECN packets in a burst can all be marked, this gives an instant signal without having to drop anything.

Even though the congestion signalling algorithms for the two types of packet are based on different metrics, neither type of packet can be arranged to persistently starve the other. In the early stages of queue growth, ECN packets will experience more congestion signalling. However, the longer that non-ECN packets attempt to take advantage of this position, the more their advantage will disappear as the smoothed average queue length catches up with the instantaneous queue length. This will be discussed in more detail later with reference to FIG. 5.

ECN and instantaneous congestion signalling are the two desirable features characterising DCTCP from an AQM's point of view. By designing an AQM that protects packets supporting both these features from starvation, it becomes feasible to incrementally deploy these two changes into pre-existing networks.

For non-ECN packets, it is generally important that congestion loss is based on smoothed, rather than instantaneous, queue length. It is desirable to set a shallow threshold for ECN marking in order to keep queuing delay low. In order to prevent starvation, this implies that the threshold for non-ECN packets must be equally shallow. If the dropping algorithm did not smooth the queue length, non-ECN packets would be faced with just a very short buffer, resulting in either low utilisation or high loss rates. Whereas, by using a smoothed queue length, bursts of non-ECN packets can exceed the threshold without being dropped, as long as they do not persist long enough for the average queue length to catch up.

Moving, not Removing the Smoothing Function

From examining FIG. 5, it may seem that the process based on the smoothed queue generates fewer congestion signals than the process based on the instantaneous queue, because the smoothed queue stays below the lower threshold, $q_0$, for more of the time. This does not need to be problematic because, although the ECN signals are not smoothed when they are generated, they can be smoothed when they are consumed at the sender (or receiver). At this point, bursts of signalling can similarly be filtered out, but with respect to the actual round trip time of the end-system, not some compromise round trip time assumed by the network.

This is how DCTCP achieves its advantage, because each host can smooth over a duration matching its own feedback delay. Whereas a queue in the network cannot easily know the round trip time of each flow, so it has to smooth over some compromise duration between the fastest and slowest feedback delays of different hosts.

In the DCTCP approach, hosts with extremely short feedback delay can smooth out bursts shorter than their own delay, but they can still respond extremely rapidly to fluctuations in the queue that persist beyond this. Then they can trim peaks and fill troughs using the instant feedback from the queue.

In contrast, if the signal is smoothed in the network using some average feedback delay, any flows with much shorter-than-average feedback delay loops only get a signal that the queue length has changed many round trip times after they could usefully have responded to it.

To put this in perspective, some flows traversing a queue in an access network will be coming from a cache a couple of milliseconds away, while others will come from other continents, hundreds of milliseconds away. Queue management algorithms generally smooth over tens of milliseconds as a compromise, which means that the short round trip flows get congestion signals ten or so round trips after they could first have responded.

To summarise, preferred embodiments of the invention provide ways to incrementally deploy a shift of the function that smoothes congestion signals from the network to end-systems. This is advantageous because end-systems know their own feedback loop delay and can therefore filter out bursts on the correct timescale. In the current network-based approach, the network does not have the necessary delay information about each flow, so it will frequently filter out bursts it should have left and leave in bursts it should have filtered.

According to a first aspect of the present invention, there is provided a method of signalling congestion being caused by data items received at a network element in a communications network, the network element having a queue having a length, the method comprising steps of:

identifying, in respect of each of a plurality of received data items, whether or not said data item is capable of carrying a congestion indication;

determining a first queue length characterisation, said first queue length characterisation being determined according to a first function such as to depend on measurements inferring the length of the queue at a plurality of different times;

determining a second queue length characterisation, said second queue length characterisation being determined according to a second function such as to depend on a current or recent measurement inferring the length of the queue, the most recent queue length being more strongly weighted in said second function than it is in said first function;

applying a sanction in respect of data items identified as not being capable of carrying congestion indications in dependence on said first queue length characterisation; and assigning congestion indications to data items identified as being capable of carrying congestion indications in dependence on said second queue length characterisation.

The assigning step may involve assigning congestion indications to the data items with a probability dependent on the second queue length characterisation, and in the absence of a queue, not assigning congestion indications to them. This may be applicable where the congestion indications are ECN marks. Alternatively the assigning step may involve assigning congestion indications such as multi-bit congestion indications to the data items, in which case the indications themselves may depend on the second queue length characterisation.

The first and second functions may be chosen such that the second queue length characterisation depends to a greater extent than the first queue length characterisation on the most recent measurement of the length of the queue. Alternatively or additionally, the first and second functions may be chosen such that the first queue length characterisation depends to a greater extent than the second queue length characterisation on one or more previous measurements of the length of the queue.

According to preferred embodiments, the first function is chosen such that the first queue length characterisation is determined as a moving average, preferably a weighted moving average, of the length of the queue at a plurality of different times. By virtue of a weighted moving average of the length of the queue, the first function may ensure that greater weight is given to more recent measurements of the length of the queue than to less recent measurements of the length of the queue. Preferably, the first queue length characterisation is determined as an exponentially-weighted moving average of the length of the queue.

According to preferred embodiments, the second function is chosen such that the second queue length characterisation is the current or most recent queue-length, or is indicative thereof. In this regard, it essentially gives full weighting to the most recent queue length, and can be, or be substantially equivalent to, an instantaneous measurement of queue length.

Alternatively, instead of being dependent just on the most recent queue length, the second function may be chosen such that the second queue length characterisation is determined as a weighted moving average of the length of the queue at a plurality of different times, in which case the second function should give sufficient weight to the most recent measurement of the length of the queue as to be indicative of current queue length. It is thus possible that both the first and second functions may use moving averages.

Alternatives to using a weighted moving average may be preferred in certain embodiments, such as using the average over a sliding window, or the minimum of the characterizations of the queue during a sliding interval of time.

According to preferred embodiments, the length of the queue at a particular time is indicative of the size of a backlog of data items requiring processing and/or forwarding by the network element at that time. The backlog may be measured as the length of the queue in bytes, in packets or as the service time (sojourn time) that a packet is held within the queue, or within a composite of a number of queues.

According to preferred embodiments, the step of applying a sanction in respect of data items identified as not being capable of carrying congestion indications may comprise performing one or more of the following actions in respect of one or more of said data items in dependence on said first queue length characterisation: dropping; truncating; delaying; de-prioritising; tagging; re-routing; forwarding to a destination other than an intended destination; issuing an out-of-band congestion notification.

According to preferred embodiments, the method may further comprise forwarding respective data items identified as not being capable of carrying congestion indications to an intended destination thereof in the event that no sanction is applied in respect thereof.

According to preferred embodiments, the method may further comprise forwarding respective data items identified as being capable of carrying congestion indications to an intended destination, said data items to which congestion indications have been assigned carrying those congestion indications.

According to preferred embodiments, the identifying step may comprise identifying, in respect of said data items, whether or not they are capable of carrying an Explicit Congestion Notification indication.

According to alternative embodiments, the queue in respect of which the queue length characterisations are determined may be a virtual queue. In such embodiments, data items may be marked, dropped or otherwise sanctioned in dependence on the evolution of the virtual queue.

According to alternative embodiments, data items identified as being capable of carrying congestion indications may be enqueued to a first buffer and data items identified as not being capable of carrying congestion indications may be enqueued to a second buffer, the queue being a composite queue the length of which is inferred from monitoring the first and second buffers.

The queue may be a composite queue the length of which is inferred from monitoring buffers at a plurality of network elements, rather than just one network element.

According to alternative embodiments, one or both of the steps of applying a sanction and assigning congestion indications in order to signal congestion may be performed probabilistically in dependence on the applicable queue length characterisation.

With embodiments according to the first aspect as set out above, it will be understood that the two queue length characterisations are determined according to different functions in such a way that they are essentially "differently smoothed" (as defined above). By treating data items that are not capable of carrying congestion indications in dependence on one of these queue length characterisations (i.e. the first), and treating data items that are capable of carrying congestion indications in dependence on the other of these queue length characterisations (i.e. the second), it is possible to signal congestion in a way that is not otherwise possible, and in such a way that allows for the two types of data item to be treated equally favourably (should that be the required aim), and in a manner that is incrementally-deployable in pre-existing networks such as TCP/IP networks, while making possible superior performance such as that obtainable in specialised networks using DCTCP.

Where embodiments according to the first aspect use two "differently smoothed" queue length characterisations, determined according to different functions as set out above, and apply sanctions or assign congestion indications (as appropriate) in dependence respectively on the queue length characterisations, an alternative to this that is capable of achieving correspondingly advantageous results is to apply the "different smoothing" to the probability of applying sanctions, rather than to the queue length characterisations.

According to a second aspect of the present invention, there is therefore provided a method of signalling congestion being caused by data items received at a network element in a communications network, the network element having a queue having a length, the method comprising steps of:
  identifying, in respect of each of a plurality of received data items, whether or not said data item is capable of carrying a congestion indication;
  determining, at each of a plurality of different times, respective queue length characterisations, each said queue length characterisation being determined according to a function such as to depend on a current or recent measurement inferring the length of the queue;
  assigning congestion indications to data items identified as being capable of carrying congestion indications with a probability dependent on the most recent of said queue length characterisations; and
  applying a sanction in respect of data items identified as not being capable of carrying congestion indications with a probability dependent on probabilities determined in dependence on queue length characterisations determined at a plurality of different times, the probability determined in dependence on the most recent queue length characterisation being more strongly weighted in the assigning of congestion indications to data items identified as being capable of carrying congestion indications than it is in the applying of sanctions in respect of data items identified as not being capable of carrying congestion indications.

The various options and preferred embodiments referred to above in relation to the first aspect are also applicable in relation to the second aspect.

Where embodiments according to the first and second aspects relate to signalling congestion being caused by data items received at network elements in communications networks, it will be understood that corresponding techniques can be used in relation to signalling congestion being caused by other types of item requiring service or capacity from other types of shared resources.

According to a third aspect of the present invention, there is therefore provided a method of signalling congestion being caused by items requiring service or capacity from a shared resource, the shared resource having a queue having a length, the method comprising steps of:
  identifying, in respect of each of a plurality of said items, whether or not said item is capable of carrying a congestion indication;
  determining a first queue length characterisation, said first queue length characterisation being determined according to a first function such as to depend on measurements inferring the length of the queue at a plurality of different times;
  determining a second queue length characterisation, said second queue length characterisation being determined according to a second function such as to depend on a current or recent measurement inferring the length of the queue, the most recent queue length being more strongly weighted in said second function than it is in said first function;
  applying a sanction in respect of items identified as not being capable of carrying congestion indications in dependence on said first queue length characterisation; and
  assigning congestion indications to items identified as being capable of carrying congestion indications in dependence on said second queue length characterisation.

It will be understood that the "items requiring service or capacity from a shared resource" referred to in the third aspect may correspond to the "data items received at a network element in a communications network" referred to in the first and second aspects, in which case the bandwidth of a communications link may be regarded as the "shared resource", and the service required by the data items may be that they are forwarded on towards an intended destination in the network. As will be discussed later, various other embodiments exist in which the shared resource is a resource other than "bandwidth", however.

The various options and preferred embodiments referred to above in relation to the first and second aspects are also applicable in relation to the third aspect.

According to a fourth aspect of the present invention, there is provided apparatus operable to perform methods according to any of the first, second and third aspects. In relation to methods of signalling congestion being caused by data items received at a network element in a communications network, such apparatus may be a component of the network element performing the method in respect of itself, or may be a separate device performing the method on behalf of the network element. In relation to methods of signalling congestion being caused by items requiring service or capacity from a shared resource, such apparatus may be a component of the shared resource, performing the method in respect of itself, or may be a separate device performing the method on behalf of the shared resource.

The various options and preferred embodiments referred to above in relation to the first, second and third aspects are also applicable in relation to the fourth aspect.

BRIEF DESCRIPTION OF THE DRAWINGS

A preferred embodiment of the present invention will now be described with reference to the appended drawings, in which:

FIG. 1 shows the layout and names of the fields of an IPv4 header;

FIG. 2 shows the layout and names of the fields of an IPv6 header;

FIG. 3 indicates the meanings of the four codepoints available using the two ECN bits in the ECN field of an IPv4 header or an IPv6 header;

FIG. 4 illustrates the outcome of an Active Queue Management (AQM) technique using Random Early Detection (RED);

FIG. 5 illustrates the possible outcome of an RED AQM technique modified to use instantaneous ECN signalling;

FIG. 6 illustrates the possible outcome of a threshold AQM technique modified to use instantaneous ECN signalling;

FIG. 7 is a flow diagram illustrating an AQM technique with smoothed loss signalling but instantaneous ECN signalling, according to a preferred embodiment;

FIG. 8 is a flow diagram illustrating an alternative AQM technique with smoothed loss signalling but instantaneous ECN signalling, according to an alternative embodiment;

FIG. 9 is a flow diagram illustrating another alternative AQM technique with loss signalling based on a smoothed probability calculation rather than a smoothed queue length and FIG. 10 illustrates entities that may be involved in conveying data items along a path across one or more networks.

DESCRIPTION OF PREFERRED
EMBODIMENTS OF THE INVENTION

With reference to the accompanying figures, methods of signalling congestion according to a preferred embodiment will be described with reference to FIGS. 5, 6, 7, 8, 9 and 10.

A RED AQM technique modified to use instantaneous ECN signalling will now be described with reference to FIG. 5. The same example queuing process is illustrated in FIG. 5a) as was used in FIG. 4a).

The active queue management (AQM) algorithm in FIG. 5b) shows the dependence of ECN marking probability, $p_E$, on the instantaneous queue, q, and the dependence of drop probability, $p_N$, on the smoothed queue, $q_{ave}$. In FIG. 5b) the two functions appear visually indistinguishable from the original RED algorithm in FIG. 4b) and indistinguishable from each other, being exactly overlaid on each other. However, the metric that each depends on from the horizontal axis is different, which is apparent from the parameter that each depends on in the function notation $p_E(q)$ and $p_N(q_{ave})$. This difference is illustrated in FIG. 4c), where the ECN marking probability, $p_E$, more faithfully tracks the instantaneous queue length, q, while it is lagged by the more sluggish movements in drop probability, $p_N$, that track the smoothed queue length, $q_{ave}$, which is inherently delayed by the smoothing process.

A threshold AQM technique modified to use instantaneous ECN signalling will now be described with reference to FIG. 6. The shape of the congestion notification probability function in FIG. 6b) is a simple step threshold as used in DCTCP, rather than the piecewise linear function of Gentle RED in FIG. 5b). Nonetheless, despite the difference in shape of function, drop probability is still dependent on the smoothed queue, and ECN marking probability is still dependent on the instantaneous queue, as in the technique described with reference to FIG. 5. Again, the rises and falls of drop probability lag those of ECN marking probability, as illustrated in FIG. 6c).

FIG. 7 is a flow diagram illustrating an AQM technique with smoothed loss signalling but instantaneous ECN signalling, according to a preferred embodiment, which highlights the difference in processing between ECN-capable and non-ECN-capable packets received by a network element such as a router or switch in a network. Such a technique may be performed by a network element such as one of the intermediate "forwarding" routers 15 shown in FIG. 10, or by one of the other nodes or devices 11, 13, 17, 19 which will be explained below. The technique may also be performed in the Sender S 11; or in Receiver R 19. The technique may be performed in a buffer where multiple data flows funnel into a single serial link, or it may be located in any buffer, such as one that absorbs variations in the delay of a processing function such as encryption, encoding or compression. For each packet received by the network element (indicated by block s1), the network element updates the smoothed queue length, $q_{ave}$, (s2), then determines (s3) whether the packet is ECN-capable or not.

If the packet is ECN-capable, the packet may be marked with an ECN congestion mark (s4), the probability of marking being dependent on the current or otherwise most recent measurement of the instantaneous queue length, q, and may then be forwarded on towards its intended destination carrying the congestion mark. The proportion of packets that reach the destination carrying congestion marks serves as an explicit indication of the level of congestion at routers on the path taken by the packets.

If the packet is not ECN-capable, as it cannot carry an ECN congestion mark, it may instead be dropped. In order to implement this, the packet may be dropped with a probability dependent on the updated smoothed queue length, $q_{ave}$ (s5). The proportion of packets that fail to reach the intended destination may thus serve as an implicit indication of the level of congestion at routers on the path taken by the packets.

It will be noted that with non ECN-capable packets, packets need not be dropped to signal congestion—they may instead be forwarded having had a sanction applied thereto such as stripping of their payload, or may be forwarded via a less direct path, for example.

FIG. 8 illustrates the flow diagram for an alternative AQM technique to the embodiment illustrated in FIG. 7. Steps s6, s8, s9 and s10 are respectively identical to steps s1, s2, s3 and s5 in FIG. 7. The only difference from the process illustrated in FIG. 7 is that the smoothed queue is updated (s7) on the arrival of any packet, whether ECN-capable or not, even though the value of the smoothed queue is only used if the packet is not ECN-capable; to determine if the packet should be discarded or otherwise sanctioned (s10). If the packet is ECN-capable, the algorithm decides whether to ECN-mark the packet dependent only on the instantaneous queue and does not use the smoothed queue. This alternative approach still updates the smoothed queue whether or not it is used, however, in order to calculate the smoothed queue more precisely, given the queue consists of both ECN-capable and non-ECN-capable packets. The preferred embodiment illustrated in FIG. 7 has the advantage of requiring less processing, and it gives a reasonable approximation of the smoothed queue by sampling the queue length only when a non-ECN-capable packet arrives.

FIG. 9 illustrates the flow diagram for an alternative AQM technique to the embodiments illustrated in FIGS. 7 and 8. For each packet received by the network element (indicated by block s11), the network element calculates a probability value, p, dependent on the instantaneous queue length, q (step s12). It then determines (s13) whether the packet is ECN-capable or not. If the packet is ECN-capable, it marks the packet dependent on the instantaneous probability, p (step s14). If the packet is not ECN-capable, it calculates a smoothed probability value, $p_{ave}$ (step s15), dependent on current probability value, p and previous values of p. Then (s16) it drops or otherwise sanctions the packet dependent on this smoothed probability $p_{ave}$.

In a similar way to the previous alternative embodiment in FIG. 8, step s15 could be enacted before step s13 using all probability values to calculate the smoothed probability value $p_{ave}$, rather than only the selection of probability values calculated for non-ECN capable packets.

FIG. 10 illustrates entities that may be involved in conveying data items along a path between two computers or other such devices, which will be referred to as a "Sender S" 11 and a "Receiver R" 19, connected via a network 10 with several intermediate routers 15. Sender S may simply be acting as a sender of data along end-to-end path 12, with Receiver R simply acting as a receiver of that data, but it will be understood that both computers may in fact be performing both the sending and the receiving functions.

Sender S is connected to the network 10 through Network Attachment Node 13 and Receiver R is connected to the network through Network Attachment Node 17. Feedback data such as congestion information relating to data that Receiver R has received from Sender S may be provided from Receiver R to Sender S via network attachment nodes 17, 13 and intermediate nodes 15, or via alternative routes through network 10 or otherwise.

There may be plural interconnected networks 10a, 10b, etc. (shown using dashed lines) between Sender S and Receiver R, possibly of different types or operated by different network providers or other entities, rather than a single, homogenous, uniformly-controlled network.

Variants

Not just packets: Embodiments of the invention could be applied equally to traffic arriving in datagrams, frames or other discrete units of data.

Various sanctions: in the preferred embodiment congestion sanctions can either be in the form of ECN-capable traffic marking or non-ECN-capable traffic dropping. Possible variations on the sanction applied to non-ECN-capable traffic include, but are not limited to:
re-routing;
delaying;
damaging or truncating (e.g. truncating the payload but forwarding the header, perhaps with an indication that would distinguish it from other causes of packet damage or discard);
downgrading the class of service;
tagging.

Multi-bit congestion notification: On ECN-capable packets, rather than signalling congestion by means of a binary packet marking with a probability that depends on the queue length, the probability of congestion notification itself could instead be written into the packet header as a real number, if a larger ECN field were made available, as for instance is the case with quantised congestion notification (QCN) [IEEE802.1Qau]. In other respects, this alternative embodiment works in the same way as the preferred embodiment.

Alternative congestion measurement metrics: Notification of congestion may depend on the queue length in bits, the queue length in numbers of packets, the service time of the queue, or some hybrid of these. Congestion notification may be generated where there is no queue to model congestion. For instance, congestion notification may alternatively depend on how closely the transmission power of a radio transmitter approaches its maximum, or a measurement of radio spectrum congestion such as interference or errors resulting from interference. In other respects, this alternative embodiment works in the same way as the preferred embodiment.

AQM applied other than when enqueuinq: in the preferred embodiment, the mark/drop decision is made on the packet in the process of being enqueued. This is not intended to preclude alternative queuing arrangements where the sanction decision is made as packets are de-queued or if packets are discarded or marked in the middle of the queue.

Two smoothing algorithms: a variant of the present invention can be framed around a WRED-AQM [WRED]. With this variant the network administrator can configure two WRED functions to apply to the same traffic class, unlike how WRED is intended to be configured.

One WRED function is applied to ECN-capable packets and the other to non-ECN-capable packets, both within the same traffic class. This is possible with most routers and switches because in IP packets the ECN field consists of two bits that were separated out in 2001/2 from an 8-bit field that used to be intended for Type-of-Service (IPv4) or traffic class (IPv6) [RFC3260, Section 4]. Similarly, for MPLS frames, ECN capability is indicated within the same field as the traffic class [RFC5129].

The operator may configure the thresholds for both WRED functions within the same traffic class to be substantially the same. However, although the operator sets the smoothing parameter to its traditional value for the non-ECN-capable function, it reduces the smoothing parameter to zero (or near-zero) for the ECN-capable function. This ensures that no smoothing delay is introduced by the network when signalling congestion on ECN packets.

To support ECN within more than one traffic class, the operator will configure a pair of WRED functions for each traffic class that supports ECN. The main or only difference between the paired functions within each class will be that the smoothing parameter is set to zero (or near-zero) for the ECN-capable function.

This WRED variant is possible in three queuing arrangements:

Each traffic class may be served by a separate queue with a service rate determined by a priority scheduler. In this case, a pair of WRED algorithms will need to be configured for each queue, so that the smoothing delay parameter can be reduced for ECN-capable traffic.

AU traffic classes may be served by the same FIFO queue as with traditional WRED. In this case, higher priority traffic classes will be configured with more permissive thresholds than lower priority classes as for traditional WRED, but each pair of WRED functions within each class will have substantially the same thresholds as each other.

A hybrid of the above two queuing arrangements is also possible.

Compared to traditional methods, the WRED variant will require up to twice as many sets of AQM parameters to be configured. Although this requires more configuration, the advantage of this variant is that it can be deployed immediately with existing equipment; merely by configuring it in an unexpected way. The disadvantage of this variant is that it maintains two smoothing algorithms, which require more processing per packet compared to the preferred embodiment. Although one smoothing algorithm is configured for the degenerate case of zero smoothing, it still executes the same processing steps. Nonetheless, this variant avoids the need to upgrade the implementation, which may require existing equipment to be replaced if the AQM implementation is in hardware.

Separate buffers: ECN-capable and non-ECN-capable packets can be enqueued to different buffers with the following three exemplary queuing arrangements:

Multiple buffers are served, each with a FIFO regime while a counter meters all ECN and non-ECN incoming and outgoing packets so as to infer a single queue characterisation as a composite of the queues for the two traffic types. This queue characterisation can be interpreted as an instantaneous queue length and as in the preferred embodiment can be used to determine the probability of congestion marking to be applied to the ECN-capable traffic. As in the preferred embodiment, a smoothed version of such an instantaneous queue can be used to determine the sanction probability for the non-ECN-capable traffic. In other respects, this embodiment may work in the same way as the preferred embodiment Multiple buffers are served with a strict-priority queuing regime, so that traffic is served by separate queues and higher priority traffic is transmitted before lower priority traffic. In this case, congestion notification is performed within each traffic priority type depending upon its own queue characterisation but also depending on the queue characterisation(s) of lower priority classes. This means that the queue characterisation of the lowest priority traffic's queue only depends upon enqueued packets in its own class, while the characterisation of the second-lowest priority traffic's queue depends upon enqueued packets in its own class as well as those in the lowest priority queue. For instance, the characterisation could be calculated as the sum of the two queue lengths. If more than two priorities exist, the queue characterisation of the third-lowest priority traffic's queue depends upon enqueued packets in its own class as well as those in the lowest and second-lowest priority queues, etc. Within each class, the relevant queue characterisation can be interpreted as an instantaneous queue length and, as in the preferred embodiment, it can be used to determine the probability of congestion marking to be applied to the ECN-capable traffic. As in the preferred embodiment, a smoothed version of such instantaneous queue characterisation can be used to determine the sanction probability for the non-ECN-capable traffic. In other respects, this alternative embodiment may work in the same way as the preferred embodiment.

Alternatively, congestion notification may be performed within each traffic priority type depending upon its own queue characterisation but also depending upon higher priority classes' queue characterisation(s). This means that the queue characterisation of the highest priority traffic's queue only depends upon enqueued packets in its own class, while the characterisation of the second-lowest priority traffic's queue depends upon enqueued packets in its own class as well as enqueued packets in the highest priority queue. For instance, the characterisation could be calculated as the sum of the two queue lengths. If more than two priorities exist, the queue characterisation of the third-highest priority traffic's queue depends upon enqueued packets in its own class as well as enqueued packets in the highest and second-highest priority queues etc. In other respects, this alternative embodiment may work in the same way as the above embodiment.

A hybrid of the above queuing arrangements is also possible.

Buffer management variants: the preferred embodiment is framed within a scenario where the buffer uses the RED active queue management algorithm (see FIG. 5), but any other algorithm could be used, including (but not limited to):

a simple threshold (see FIG. 4);

different shape functions to calculate the probabilities of discard and marking.

Also, the first embodiment is framed within a scenario that uses a FIFO buffer, but other queuing disciplines may be appropriate, including (but not limited to):

a buffer that is part of a more complicated queuing system, but is FIFO within itself, e.g.:
    a set of buffers with different scheduling priorities
    a weighted scheduler, such as weighted round-robin or weighted fair-queuing.
    In these cases, the inventive concept can be applied within each individual user's queue that is waiting to be served by the scheduler.
a set of buffers with different scheduling priorities, but where the drop or marking probability of one buffer is dependent on the queue size in other buffers (e.g. [Gibbens02]). In this case, the inventive concept can be applied directly to the queue size measurements already used for notification.

Smoothing drop/sanction probability rather than queue length: In an alternative embodiment (FIG. 9), instead of delaying congestion signalling for non-ECN traffic by smoothing the queue length over time, delayed congestion notification can be achieved by smoothing the drop probability (or more generally, the probability of sanction). As in the preferred embodiment, the probability p of ECN-marking will depend on the instantaneous queue length, while in this variant the probability $p_{ave}$ of sanctioning non-ECN-capable traffic is a smoothed function of p. For example probability $p_{ave}$ can be obtained as an exponentially-weighted moving average of p. Smoothing non-ECN signals in this way may make it easier to make the rate responses to congestion comparable between ECN and non-ECN flows. Given ECN signals are not smoothed by the proposed AQM algorithm, ECN signals are likely to be smoothed by the end-system before it alters its sending rate in response. Because ECN signals will be smoothed, rather than queue length, it is comparable to smooth non-ECN signals too, rather than smoothing queue length.

It may also be desirable to pass sanction probabilities through a non-linear algorithm that biases against low probabilities of sanction, just as the current RED algorithm biases against low queue lengths.

Virtual queue: In an alternative embodiment, packets could be marked, or dropped or otherwise sanctioned, depending on the evolution of a virtual queue. A virtual queue does not buffer packets; it is merely a counter that tracks the length of the fictitious queue of packets that would form if the line rate were (generally) somewhat slower than the real line. If a real queue has an output rate Y a virtual queue indicative of conditions if the line rate were slightly slower would have a slightly lower output rate $(1-\epsilon)Y$, where $\epsilon \ll 1$. This alternative embodiment is very similar to the preferred embodiment except that the proposed AQM function measures the length of a virtual queue, not the real queue. If the aggregate input rate approaches the virtual output rate $(1-\epsilon)Y$, the virtual queue grows. This virtual queue length can be interpreted as the instantaneous queue length used to drive the probability of ECN marking in the preferred embodiment. Similarly, for non-ECN-capable traffic the probability of congestion sanctioning can depend on a smoothed length of the virtual queue; In other respects, this alternative embodiment operates in the same way as the preferred embodiment.

Distributed buffers and/or congestion signaling functions: the first embodiment has been described in relation to a scenario where the buffer and congestion signalling functions are within the same machine. An alternative may be to distribute these elements in cases where it is more convenient for the actual buffers to be remote from congestion signalling functions. For instance, distributed arrangements include (but are not limited to) the following:

In a DOCSIS (data over cable system) cable system, the cable capacity is divided into channels separated using time-division multiplexing. A node central to a whole hybrid-fibre-coax cable called the cable-modem terminal server (CMTS) arbitrates access to each data channel, using a system of out-of-band messages. In the upstream direction, there are numerous buffers—at least one in each cable modem—on entry to the shared cable network. Thus, instead of the single FIFO buffer, this system involves numerous buffers, each holding a logically separate queue of traffic, but all waiting to enter a single physical resource that is logically divided into time-slots.

Although not as straightforward as the simple single buffer, it is possible for the CMTS to assign traffic capable of carrying congestion signals and traffic not capable of carrying congestion signals to separate queues and meter all incoming and outgoing traffic so as to infer a combined single queue length. This queue length can be interpreted as an instantaneous queue length and as in the preferred embodiment can be used to determine the probability of congestion marking applied to packets that are capable of carrying congestion signals. As in the preferred embodiment, a smoothed version of such an instantaneous queue can be used to introduce signalling delay and drive a sanction probability for traffic not capable to carry congestion signals. In other respects, this alternative embodiment works in the same way as the preferred embodiment.

A passive optical network (PON) uses time-division multiplexing in a similar way to a DOCSIS cable system. Although PONs differ from DOCSIS cable networks in many details, the approach described above for DOCSIS translates directly into a PON scenario.

In a cellular system, the wireless spectrum is a shared link, conceptually similar to the shared cable in a DOCSIS system. In UMTS and LTE, the spectrum is separated into channels using code-division multiple access (CDMA). Similarly to cable, each mobile terminal (handset) has a buffer to queue data waiting to be allowed to transfer upstream over the radio spectrum. The radio network controller (RNC) serves a similar function to the CMTS in a cable network, arbitrating requests for transmission channels as the centre of the radio resource control system.

Again, congestion sanctioning for packets capable or not of carrying congestion signals is not as straightforward as with the simple a single buffer, but it is conceptually similar to the cable case and, at high level, conceptually similar to the single buffer case.

In the downstream direction, all these systems involve a centralised buffer, and can be modelled on the simpler scenario depicted in FIG. 5.

Not just bandwidth: The preferred embodiment has been described in a scenario where the resource being shared is the bandwidth of a communications link and the items queuing to use the resource are packets. The following non-exhaustive list of alternative embodiments would be possible, where the inventive concept is applied to other shared resources and other queued items:

Requests to use the call-processing resource of a call server;

Requests to use the processing resource of a shared computer;

Requests to use the storage resource of a shared pool of memory (e.g. disks);

Requests to use a processing resource in a workflow system, where the processing resource may represent a mechanical or human operated function not only a computing function (e.g. shared machines, field engineers, call-centre staff);

Vehicles using a road transport system;

Units of usage of an energy supply network, supplying for example electricity or gas.

It would be appropriate to apply the inventive concept in any of these cases if some form of explicit notification of congestion were introduced that co-existed with a legacy system that simply discarded queued requests to use the resource.

Combinations of variants: Further alternative embodiments may be created by combining a variant of one part of the preferred embodiment with a variant of another part. For instance, the virtual-queue-based embodiment could be combined with the embodiment where the AQM function re-routes packets towards the sanctioning function. Numerous alternative combinations of these variants would also be possible.

REFERENCES

[Gibbens02]: Gibbens, R. J. & Kelly, F. P., "On Packet Marking at Priority Queues," IEEE Transactions on Automatic Control 47(6):1016-1020 (June 2002)

[WRED]: Technical Specification from Cisco, Weighted Random Early Detection, URL: http://www.cisco.com/en/US/docs/ios/11_2/feature/guide/wred_gs.html#wp4256.

The invention claimed is:

1. A method of signalling congestion being caused by data items received at a network element in a communications network, the network element having a queue having a length, the method comprising steps of:
   identifying, in respect of each of a plurality of received data items, whether or not said data item is capable of carrying a congestion indication;
   determining a first queue length characterisation, said first queue length characterisation being determined according to a first function such as to depend on measurements inferring the length of the queue at a plurality of different times;
   determining a second queue length characterisation, said second queue length characterisation being determined according to a second function such as to depend on a current or recent measurement inferring the length of the queue, the most recent queue length being more strongly weighted in said second function than it is in said first function;
   applying a sanction in respect of data items identified as not being capable of carrying congestion indications in dependence on said first queue length characterisation; and
   assigning congestion indications to data items identified as being capable of carrying congestion indications in dependence on said second queue length characterisation.

2. A method of signalling congestion according to claim 1, wherein said first function is such that the first queue length characterisation is determined as a moving average of the length of the queue at a plurality of different times.

3. A method of signalling congestion according to claim 2 wherein the first queue length characterisation is determined as a weighted moving average of the length of the queue, the first function being such that greater weight is given to more recent measurements of the length of the queue.

4. A method of signalling congestion according to claim 3 wherein the first queue length characterisation is determined as an exponentially-weighted moving average of the length of the queue.

5. A method of signalling congestion according to claim 1, wherein said second function is such that the second queue length characterisation is the current or most recent queue length, or is indicative thereof.

6. A method of signalling congestion according to claim 1, wherein said second function is such that the second queue length characterisation is determined as a weighted moving average of the length of the queue at a plurality of different times, the second function giving sufficient weight to the most recent measurement of the length of the queue as to be indicative of current queue length.

7. A method of signalling congestion according to claim 1, wherein the length of the queue at a particular time is indicative of the size of a backlog of data items requiring processing and/or forwarding by the network element at that time.

8. A method of signalling congestion according to claim 1, wherein the step of applying a sanction in respect of data items identified as not being capable of carrying congestion indications comprises performing one or more of the following actions in respect of one or more of said data items in dependence on said first queue length characterisation: dropping; truncating; delaying; de-prioritising; re-routing; forwarding to a destination other than an intended destination; issuing an out-of-band congestion notification.

9. A method of signalling congestion according to claim 1, the method further comprising forwarding respective data items identified as not being capable of carrying congestion indications to an intended destination thereof in the event that no sanction is applied in respect thereof.

10. A method of signalling congestion according to claim 1, the method further comprising forwarding respective data items identified as being capable of carrying congestion indications to an intended destination, said data items to which congestion indications have been assigned carrying those congestion indications.

11. A method of signalling congestion according to claim 1, wherein the step of identifying comprises identifying, in respect of said data items, whether or not they are capable of carrying an Explicit Congestion Notification indication.

12. A method of signalling congestion according to claim 1, wherein the queue is a virtual queue.

13. A method of signalling congestion according to claim 1, wherein data items identified as being capable of carrying congestion indications are enqueued to a first buffer and data items identified as not being capable of carrying congestion indications are enqueued to a second buffer, and wherein the queue is a composite queue the length of which is inferred from monitoring the first and second buffers.

14. A method of signalling congestion according to claim 1, wherein the queue is a composite queue the length of which is inferred from monitoring buffers at a plurality of network elements.

15. A method of signalling congestion according to claim 1, wherein one or both of the steps of applying a sanction and assigning congestion indications in order to signal congestion is/are performed probabilistically in dependence on the applicable queue length characterisation.

16. A method of signalling congestion being caused by data items received at a network element in a communications network, the network element having a queue having a length, the method comprising steps of:
   identifying, in respect of each of a plurality of received data items, whether or not said data item is capable of carrying a congestion indication;
   determining, at each of a plurality of different times, respective queue length characterisations, each said queue length characterisation being determined according to a function such as to depend on a current or recent measurement inferring the length of the queue;
   assigning congestion indications to data items identified as being capable of carrying congestion indications with a probability dependent on the most recent of said queue length characterisations; and
   applying a sanction in respect of data items identified as not being capable of carrying congestion indications with a probability dependent on probabilities determined in dependence on queue length characterisations determined at a plurality of different times, the probability determined in dependence on the most recent queue length characterisation being more strongly weighted in the assigning of congestion indications to data items identified as being capable of carrying congestion indications than it is in the applying of sanctions in respect of data items identified as not being capable of carrying congestion indications.

17. A method of signalling congestion being caused by items requiring service or capacity from a shared resource, the shared resource having a queue having a length, the method comprising steps of:
   identifying, in respect of each of a plurality of said items, whether or not said item is capable of carrying a congestion indication;
   determining a first queue length characterisation, said first queue length characterisation being determined according to a first function such as to depend on measurements inferring the length of the queue at a plurality of different times;
   determining a second queue length characterisation, said second queue length characterisation being determined according to a second function such as to depend on a current or recent measurement inferring the length of the queue, the most recent queue length being more strongly weighted in said second function than it is in said first function;
   applying a sanction in respect of items identified as not being capable of carrying congestion indications in dependence on said first queue length characterisation; and
   assigning congestion indications to items identified as being capable of carrying congestion indications in dependence on said second queue length characterisation.

18. An apparatus comprising:
   a computer system for signalling congestion being caused by data items received at a network element in a communications network, the network element having a queue having a length,
   wherein the computer system includes a computer processor and is configured at least to:
      identify, in respect of each of a plurality of received data items, whether or not said data item is capable of carrying a congestion indication;
      determine a first queue length characterisation, said first queue length characterisation being determined according to a first function such as to depend on measurements inferring the length of the queue at a plurality of different times;
      determine a second queue length characterisation, said second queue length characterisation being determined according to a second function such as to depend on a current or recent measurement inferring the length of the queue, the most recent queue length being more strongly weighted in said second function than it is in said first function;
      apply a sanction in respect of data items identified as not being capable of carrying congestion indications in dependence on said first queue length characterisation; and
      assign congestion indications to data items identified as being capable of carrying congestion indications in dependence on said second queue length characterisation.

* * * * *